United States Patent
Shinoda et al.

(10) Patent No.: US 10,459,422 B2
(45) Date of Patent: Oct. 29, 2019

(54) SERVOMOTOR CONTROL DEVICE, SERVOMOTOR CONTROL METHOD, AND COMPUTER-READABLE RECORDING MEDIUM

(71) Applicant: FANUC CORPORATION, Minamitsuru-gun, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 249 days.

(21) Appl. No.: 15/719,718

(22) Filed: Sep. 29, 2017

(65) Prior Publication Data

US 2018/0095444 A1 Apr. 5, 2018

(30) Foreign Application Priority Data

Oct. 4, 2016 (JP) .................................. 2016-196733

(51) Int. Cl.
*G05B 19/19* (2006.01)

(52) U.S. Cl.
CPC .... *G05B 19/19* (2013.01); *G05B 2219/34013* (2013.01)

(58) Field of Classification Search
CPC combination set(s) only.
See application file for complete search history.

(56) References Cited

U.S. PATENT DOCUMENTS 6,744,233 B1 * 6/2004 Tsutsui .................. G05B 19/404
   318/560
8,896,255 B2  11/2014 Iwashita et al.
(Continued)

FOREIGN PATENT DOCUMENTS

JP        7-28527     1/1995
JP      2014-13554    1/2014
(Continued)

OTHER PUBLICATIONS

Hongbiao, Compensation of Friction and Elastic Deformation for Ball Screw Drive System, Aug. 2015, IEEE International Conference on Mechatronics and Automation , p. 1031-1035 (Year: 2015).*
(Continued)

*Primary Examiner* — Brian W Wathen
*Assistant Examiner* — Hung H Dang
(74) *Attorney, Agent, or Firm* — Wenderoth, Lind & Ponack, L.L.P.

(57) ABSTRACT

A servomotor control device includes a connection mechanism configured to connect a servomotor and a driven body, and transmit power of the servomotor to the driven body, a position command generation unit configured to generate a position command value for the driven body, a motor control unit configured to control the servomotor using the position command value, a force estimation part configured to estimate drive force acting on the driven body at a connecting part with the connection mechanism, a switching part configured to switch between a first force estimated value estimated by the force estimation part and a second force estimated value that is a fixed value, and a compensation amount generation part configured to generate a compensation amount for compensating the position command value generated by the position command generation part, based on the first or second force estimated value that was switched to by the switching part.

13 Claims, 11 Drawing Sheets

(56) References Cited

U.S. PATENT DOCUMENTS

| | | |
|---|---|---|
| 9,448,545 B2 | 9/2016 | Iwashita et al. |
| 2002/0151988 A1* | 10/2002 | Shiba .................. G05B 19/404 700/13 |
| 2008/0012520 A1* | 1/2008 | Matsumoto ............ G05B 19/41 318/630 |
| 2013/0320908 A1 | 12/2013 | Iwashita et al. |
| 2014/0121818 A1 | 5/2014 | Iwashita et al. |
| 2014/0156080 A1 | 6/2014 | Iwashita et al. |

FOREIGN PATENT DOCUMENTS

| | | |
|---|---|---|
| JP | 2014-87880 | 5/2014 |
| JP | 2014-109785 | 6/2014 |

OTHER PUBLICATIONS

Notification of Reasons for Refusal dated Sep. 4, 2018 in corresponding Japanese Patent Application No. 2016-196733.

* cited by examiner

SERVOMOTOR CONTROL DEVICE, SERVOMOTOR CONTROL METHOD, AND COMPUTER-READABLE RECORDING MEDIUM

This application is based on and claims the benefit of priority from Japanese Patent Application No. 2016-196733, filed on 4 Oct. 2016, the content of which is incorporated herein by reference.

BACKGROUND OF THE INVENTION

Field of the Invention

The present invention relates to a servomotor control device having a function of compensating the position of a driven body that is driven by the power of a servomotor, a servomotor control method, and a computer-readable recording medium.

Related Art

Conventionally, servomotor control devices have been known which install a workpiece (work) on a table, and cause the table to move via a connection mechanism by a servomotor. The table and workpiece are driven bodies. The connection mechanism has a coupling which is connected to the motor servo, and a ball screw which is fixed to the coupling. The ball screw is threaded to a nut. In one of such servomotor control devices, there is a servomotor control device having a function of compensating the position of a driven body (referred to as mobile body) that is driven by the power of the servomotor.

As a servomotor control device having a function of compensating position, for example, Patent Document 1 discloses a servomotor control device that estimates a drive force acting on a driven body at the connecting part of the connection mechanism, and compensates the position command value based on the estimated drive force.

Patent Document 2 discloses a servomotor control device that calculates the stretch/contraction amount of the ball screw from a distance from the servomotor to the mobile body, and the torque command value, calculates a position compensation amount for the mobile body threaded to the ball screw from this stretch/contraction amount, and compensates the position command value according to this position compensation amount.

In addition, Patent Document 3 discloses a servomotor control device that calculates an stretch/contraction amount of a ball screw based on a tension acting on a distal side of the ball screw from the servomotor, a distance between a pair of fixing parts supporting the ball screw at both ends, a distance from the fixing part provided at a proximal side of the servomotor until a movable body, and a torque command given to the servomotor, and calculates a position compensation mount for a feed shaft based on the calculated stretch/contraction amount of the ball screw.

Patent Document 1: Japanese Unexamined Patent Application, Publication No. 2014-109785

Patent Document 2: Japanese Unexamined Patent Application, Publication No. 2014-13554

Patent Document 3: Japanese Unexamined Patent Application, Publication No. 2014-87880

SUMMARY OF THE INVENTION

The present inventors have found that, in the case of compensating the position command value, during stop or low-speed operation, a compensation reacting to the drive force estimated and unrelated to the mechanical operation is applied to the position command value, whereby oscillation of the compensation amount arises. The present invention has an object of providing a servomotor control device for a machine tool or industrial machine capable of position control of a driven body with higher precision, a servomotor control method, and a computer-readable recording medium.

A servomotor control device according to a first aspect of the present invention is a servomotor control device, including: a servomotor; a driven body configured to be driven by the servomotor; a connection mechanism configured to connect the servomotor and the driven body, and transmit power of the servomotor to the driven body; a position command generation unit configured to generate a position command value for the driven body; a motor control unit configured to control the servomotor using the position command value; a force estimation part configured to estimate a drive force acting on the driven body at a connecting part with the connection mechanism; a switching part configured to switch between a first force estimated value estimated by the force estimation part, and a second force estimated value of a fixed value; and a compensation amount generation part configured to generate a compensation amount for compensating the position command value generated by the position command generation part, based on the first force estimated value or the second force estimated value which was switched by the switching part.

According to a second aspect of the present invention, in the servomotor control device as described in the first aspect, it is preferable for the compensation amount generation part to set, as the compensation amount, a sum of: a product of the first or second force estimated value that was switched to by the switching part and a first coefficient; and a product of the first or second force estimated value that was switched to by the switching part, a distance from the servomotor to the connecting part, and a second coefficient.

According to a third aspect of the present invention, in the servomotor control device as described in the first or second aspect, it is preferable for the second force estimated value to be a constant value determined in advance using a drive force acting on the driven body to be estimated, and having a sign corresponding to a direction of a position command created by the position command generation part.

According to a fourth aspect of the present invention, in the servomotor control device as described in any one of the first to third aspects, it is preferable for the switching part to select the second force estimated value when a command speed or a command acceleration for the position command value created by the position command generation part is no more than a desired value.

According to a fifth aspect of the present invention, in the servomotor control device as described in any one of the first to third aspects, it is preferable for the switching part to select the second force estimated value during rapid traverse operation.

According to a sixth aspect of the present invention, in the servomotor control device as described in any one of the first to fifth aspects, it is preferable for a filter to be applied to the compensation amount generated by the compensation amount generation part, when switching from the second force estimated value to the first force estimated value by way of the switching part.

According to a seventh aspect of the present invention, in the servomotor control device as described in any one of the first to fifth aspects, it is preferable for the motor control unit to have a velocity command creation part and a torque command creation part, the torque command creation part to have at least an integrator configured to integrate a speed deviation, and overwriting of the integrator to be performed when switching from the second force estimated value to the first force estimated value by way of the switching part.

A servomotor control method for a servomotor control device according to an eighth aspect of the present invention is a servomotor control method for a servomotor control device including: the servomotor; a driven body configured to be driven by the servomotor; and a connection mechanism configured to connect the servomotor and the driven body, and transmit power of the servomotor to the driven body, the method including the steps of: generating a position command value for the driven body; estimating drive force acting on the driven body at a connecting part with the connection mechanism; switching from an estimated first force estimated value to a second force estimated value which is a fixed value, in a case of a command speed or command acceleration of the position command value being no more than a predetermined value or being rapid traverse; compensating the position command value thus generated, based on the second force estimated value that was switched to; and controlling the servomotor using the position command value thus compensated.

According to a ninth aspect of the present invention, in the servomotor control method as described in the eighth aspect, it is preferable for the position command compensation value for compensating the position command value to be a sum of: a product of the second force estimated value and a first coefficient; and the second force estimated value, a distance from the servomotor to the connecting part, and a second coefficient.

According to a tenth aspect of the present invention, in the servomotor control method as described in the eighth or ninth aspect, it is preferable for the second force estimated value to be a constant value determined in advance using a drive force acting on the driven body to be estimated, and having a sign corresponding to a direction of a position command. According to an eleventh aspect of the present invention, it is preferable the servomotor control method as described in any one of the eighth to tenth aspects to further include applying a filter to the compensation value for the position command value, when switching from the second force estimated value to the first force estimated value.

According to a twelfth aspect of the present invention, in the servomotor control method as described in any one of the eighth to tenth aspects, it is preferable for the servomotor to be controlled by creating a velocity command using the position command value that was compensated, creating a torque command using a velocity command that was created, and then using the torque command, creating of the torque command to be performed using an integrator that integrates at least speed deviation, and overwriting of the integrator to be performed when switching from the second force estimated value to the first force estimated value.

A non-transitory computer-readable recording medium according to a thirteenth aspect of the present invention is a computer-readable recording medium encoded with a program for controlling a servomotor which causes a computer to execute servomotor control in a servomotor control device including the servomotor; a driven body configured to be driven by the servomotor; and a connection mechanism configured to connect the servomotor and the driven body, and transmit power of the servomotor to the driven body, the program causing the computer to execute processing of: generating a position command value for the driven body; estimating drive force acting on the driven body at a connecting part with the connection mechanism; switching from an estimated first force estimated value to a second force estimated value which is a fixed value, in a case of a command speed or command acceleration of the position command value being no more than a predetermined value or being rapid traverse; compensating the position command value thus generated, based on the second force estimated value that was switched to; and controlling the servomotor using the position command value thus compensated.

According to the present invention, high-precision position control of a driven body becomes possible which suppresses the oscillation of a compensation amount that occurs by a compensation reacting to an estimated drive force and unrelated to machine operation being added, even during stop or low-speed operation.

DETAILED DESCRIPTION OF THE INVENTION

Figure 1:
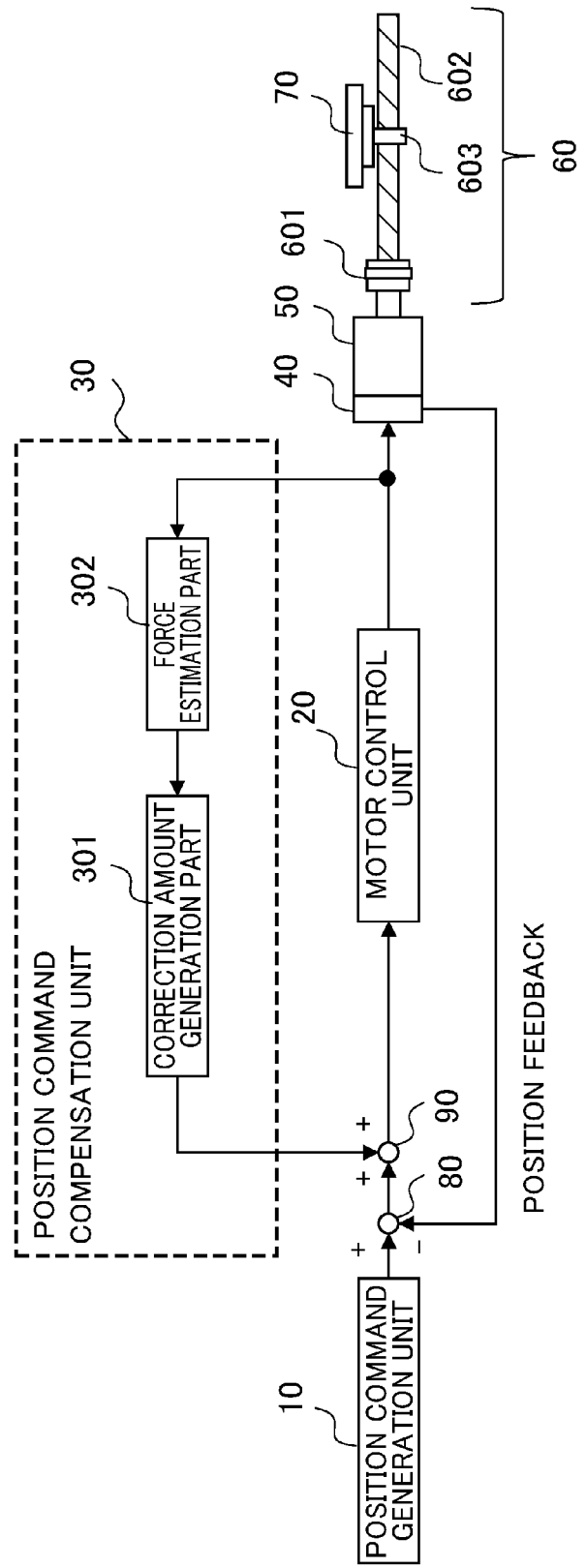
FIG. 1 is a block diagram showing the configuration of a servomotor control device serving as a technical premise.

Hereinafter, embodiments of the present invention will be explained using the drawings. First, a servomotor control device serving as a technical premise will be explained prior to the explanation of the embodiments of the present invention. FIG. 1 is a block diagram showing the configuration of a servomotor control device serving as a technical premise. The servomotor control device causes a table 70 to move via a connection mechanism 60 by a servomotor 50, and processes a workpiece (work) mounted on the table 70. The connection mechanism 60 has a coupling 601 connected to the servomotor 50 and a ball screw 602 that is fixed to the coupling, in which a nut 603 serving as a connecting part is threaded to the ball screw 602. By way of rotational driving of the servomotor 50, the nut 603 threaded with the ball screw 602 moves in the axial direction of the ball screw 602.

The rotation angle position of the servomotor 50 is detected by an encoder 40 associated with the servomotor 50 and serving as a position detection unit, the detected rotation angle position (position detected value) is used as a position feedback. It should be noted that the encoder 40 is capable of detecting the rotational speed, and the detected rotational speed (speed detected value) can be used as a velocity feedback. The servomotor control device has a position command creation part 10 that creates a position command value for the servomotor 50, a subtracter 80 for obtaining a difference between the position command value created by the position command creation unit 10 and the position detection value detected by the encoder 40, an adder 90 that adds this difference and the compensation value outputted from the position command compensation unit 30, a motor control unit 20 that creates a torque command value for the servomotor 50 using this addition value, and a position command compensation unit 30. The position command creation unit 10 creates the position command value, following a program or instruction inputted from a higher-order control device or external input device, which are not illustrated.

During driving of the servomotor 50, the drive force acts on the connection mechanism 60 and the table 70, and these elastically deform. However, since the connection mechanism 60 has low rigidity compared with the table 70, the elastic deformation of the connection mechanism 60 accounts for the majority proportion of the overall elastic deformation. When the connection mechanism 60 elastically deforms, even in a case of the servomotor 50 rotating according to the command value, error in the amount of the elastic deformation amount arises in the position of the table 70. For this reason, in order to eliminate this error, the position command compensation unit 30 compensates the position command value by the amount of the elastic deformation of the connection mechanism 60. The elastic deformation amount of the connection mechanism 60 is proportional to the drive force acting on the table 70 at the nut 603 serving as the connecting part between the table 70 and the connection mechanism 60, and the drive force can be expressed by the drive torque acting on the connecting part. The position command compensation unit 30 has a compensation amount generation part 301 and force estimation part 302. The force estimation part 302 estimates the drive force (drive torque) acting on a drive body at the connecting part using the torque command value. The compensation amount generation part 301 generates a compensation amount for compensating the position command value generated by the position command generation unit 10 based on the drive force estimated by the force estimation part 302, and outputs the compensation value to the adder 90.

Figure 2:
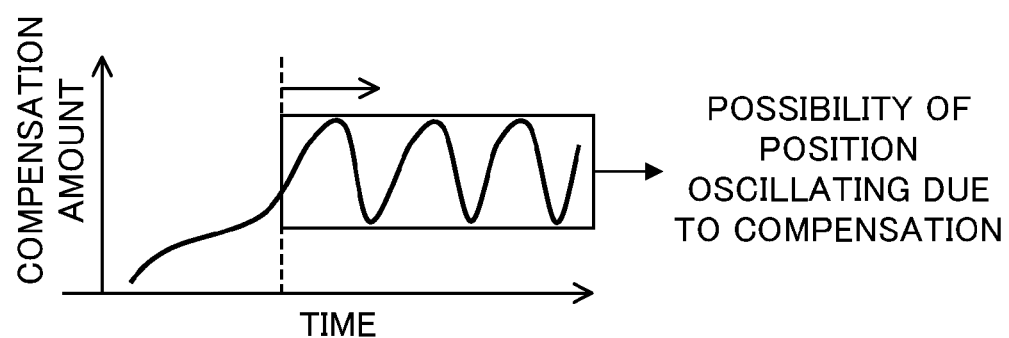
FIG. 2 is a drawing for explaining oscillation of a compensation amount.

The present inventors have found that, in a servomotor control device as the technical premise shown in FIG. 1, even during stop or low-speed operation, oscillation in the compensation amount may occur as shown in FIG. 2. This is because, the compensation responding to the estimated drive force and unrelated to the mechanical operation is added to the position command value. The present inventors have found that the oscillation of the compensation amount can be suppressed if stopping update of the drive force (torque) estimated in the force estimation part during stop or low-speed operation, and then fixing to a value determined in advance in view of the command direction. In addition, the present inventors have found that, during rapid traverse, the load torque is basically constant, and it is basically preferable to compensate by setting the load torque to a fixed value also during rapid traverse. Hereinafter, embodiments of a servomotor control device of the present invention which suppresses oscillation of the compensation amount will be explained. The mechanism to which the servomotor control device of the present embodiment explained below is applied is a machine tool such as a laser beam machine, electrical discharge machine or cutting machine; however, the servomotor control device of the present invention is applicable to industrial machinery, etc. such as robots.

First Embodiment

Figure 3:
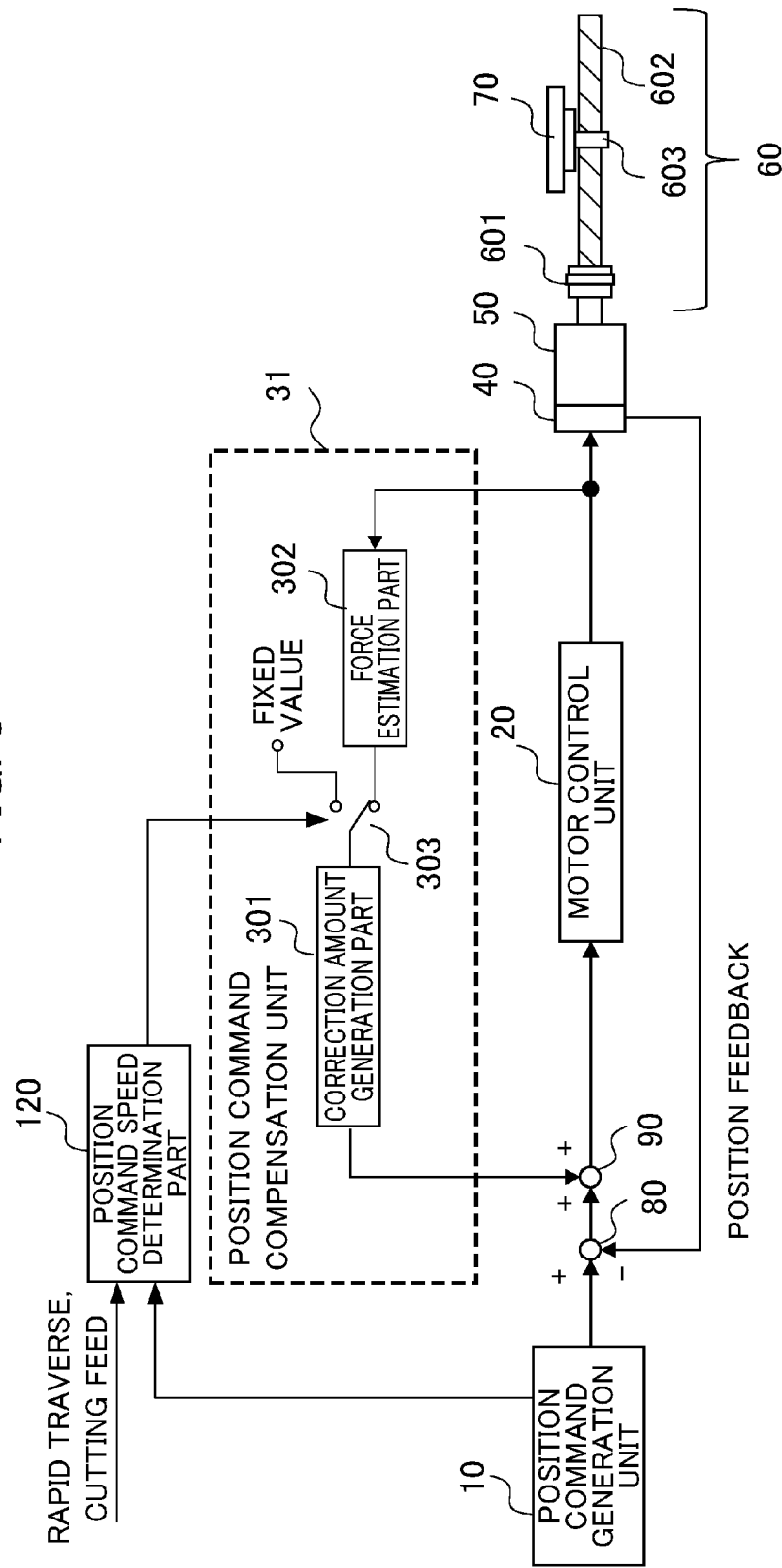
FIG. 3 is a block diagram showing the configuration of a servomotor control device serving as a first embodiment of the present invention.

FIG. 3 is a block diagram showing the configuration of a servomotor control device serving as a first embodiment of the present invention. In FIG. 3, constitutional elements that are identical to constitutional elements of the servomotor control device in FIG. 1 are assigned the same reference symbols and explanations thereof will be omitted. As shown in FIG. 3, the position command speed determination part 120 receives the position command value created by the position command creation unit 10, and generates a command speed (serving as a position command speed) for the position command value. In addition, the position command speed determination part 120 receives a signal instructing rapid traverse or cutting feed from a higher-order control device, external input device or the like.

The position command speed determination part 120, when the command speed (absolute value) is no more than a desired value (including 0), or when rapid traverse, sends a switching signal to the switch 303 serving as the switching part, so as to switch the drive force (drive torque) acting on the drive body at the connecting part from the drive force estimated by the force estimation part 302 to a fixed value. On the other hand, the position command speed determination part 120, when the command speed (absolute value) exceeds a desired value, and when a cutting feed, sends a switching signal to the switch 303, so as to switch the drive force (drive torque) acting on the drive body at the connecting part to the drive force estimated by the force estimation part 302.

In the following explanation, although a case of switching to the fixed value by the switch 303 using the command speed of the position command value is explained, it may be switched to the fixed value by the switch 303 using the command acceleration of the position command value. In the case of using the command acceleration of the position command value in place of the command speed of the position command value, the position command speed determination part 120 is replaced by a position command acceleration determination part. The position command acceleration determination part receives the position command value created by the position command creation unit 10, and generates the command acceleration (position command acceleration) of the position command value. The function of the position command acceleration determination part is the same as the function of the position command speed determination part 120, except for the point of replacing the command speed with the command acceleration.

The compensation amount generation part 301 generates the compensation amount based on the drive force set as the fixed value, or drive force estimated by the force estimation part 302, and outputs to the adder 90. In FIG. 3, the force estimation part 302 estimates the drive force (drive torque)

acting of the drive body at the connecting part using the torque command value outputted from the motor control unit 20. However, the estimation of the drive force is not limited thereto, and the force estimation part 302 may estimate the drive force by further adding acceleration/deceleration torque, disturbance torque, etc. to the torque command value, or may estimate the drive force by calculating the motor torque using the output of an electric current detection part detecting the motor current, rather than the torque command value. The fixed value is a constant value determined in advance of a sign corresponding to the direction of the position command created by the position command generation unit 10, and assumes the value of the force corresponds to the static frictional force basically.

It is sufficient if the position command speed determination part 120 switches the switch 303 so as to suppress oscillation of the compensation amount shown in FIG. 2, and when the command speed (absolute value) is no more than a desired value (including 0), it may further determine that the magnitude of the compensation amount is in the increasing direction, or in the decreasing direction based on the output from the compensation amount generation part 301, and switch the switch 303 according to the determination result thereof. For example, the position command speed determination part 120 may be configured so as to, in the case of the magnitude of the compensation amount being in the increasing direction, switch to the fixed value by the switch 303, and in the case of the magnitude of the compensation amount being in the decreasing direction, switch by the switch 303 to the drive force estimated by the force estimation part 302. The position command speed determination part 120 may be configured so as to, in the case of the magnitude of the compensation amount being in the decreasing direction, switch to the fixed value by the switch 303, and in the case of the magnitude of the compensation amount being in the increasing direction, switch by the switch 303 to the drive force estimated by the force estimation part 302. In this way, the position command speed determination part 120, when the command speed (absolute value) is no more than a desired value (including 0), can suppress oscillation of the compensation amount such as that shown in FIG. 2, even when determining that the magnitude of the compensation amount is in the increasing direction or is in the decreasing direction, and switching the switch 303.

As explained above, the servomotor control device shown in FIG. 3, in the case of the position command speed being no more than a desired value or being rapid traverse, fixes the load torque estimated to be used for calculating the elastic deformation amount of the machine to a constant value. By doing this, the servomotor control device shown in FIG. 3 can perform only compensation on the lost motion, without applying a compensation amount unrelated to the operation of the servomotor.

Figure 4:
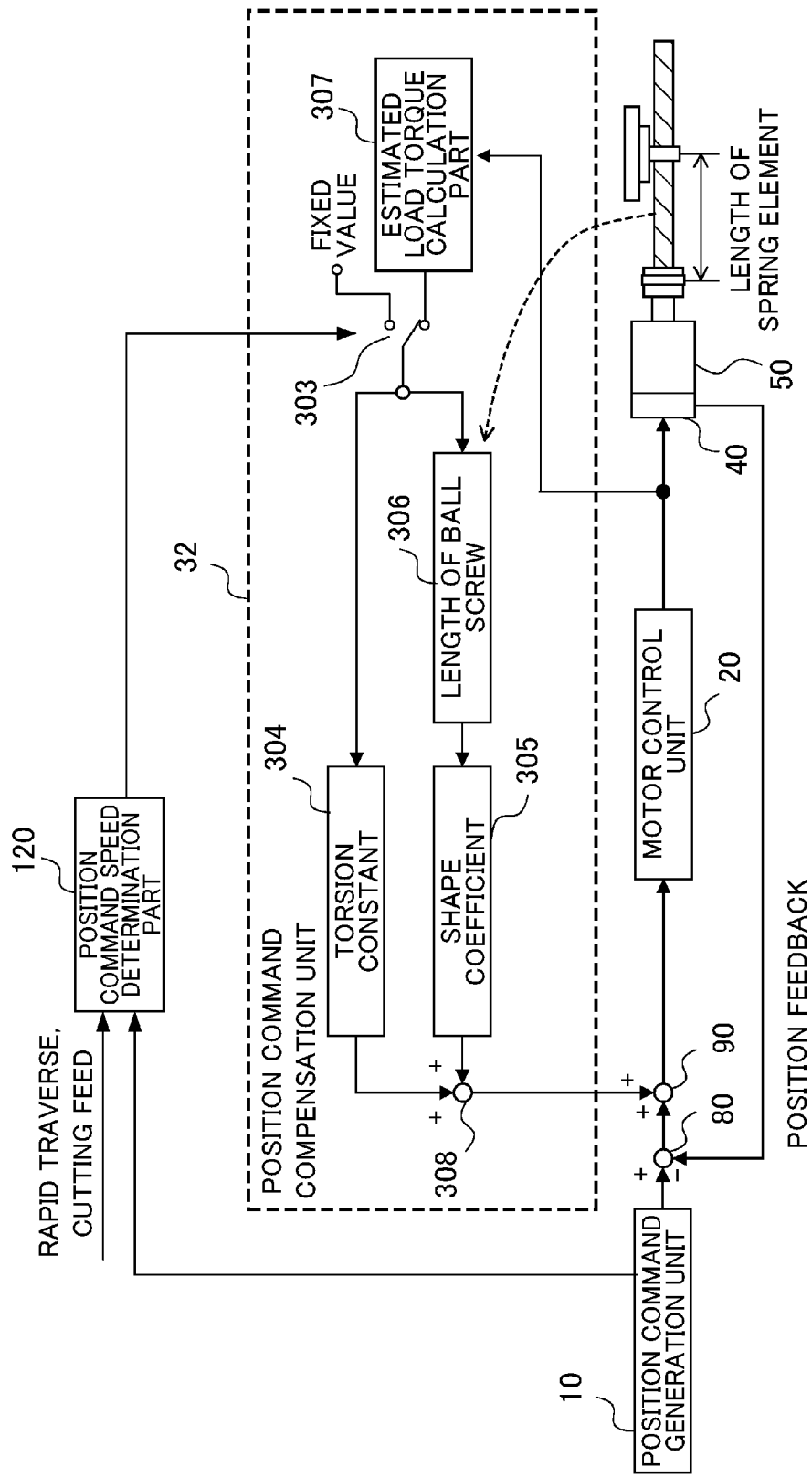
FIG. 4 is a block diagram showing the configuration of a servomotor control device including one configuration example of a position command compensation unit.

FIG. 4 is a block diagram showing the configuration of a servomotor control device including one configuration example of the position command compensation unit. The estimated load torque calculation part 307 of the position command compensation unit 32 in FIG. 4 corresponds to the force estimation part 302 in FIG. 3, and the torsion constant multiplying part 304, ball screw length multiplying part 306 and shape coefficient multiplying part 305 in FIG. 4 correspond to the compensation amount generation part 301 in FIG. 3. The shape coefficient indicates the stretch/contraction amount per unit length of the ball screw. In the present embodiment, the torsion constant multiplying part 304 calculates the torsional elastic deformation around the rotation axis generated in the connection mechanism (coupling, ball screw), based on the estimated load torque or the fixed value. The torsional elastic deformation around the rotation axis corresponds to the compensation amount related to the twist of the connecting part. In addition, the ball screw length multiplying part 306 and shape coefficient multiplying part 305 calculate the stretch/contraction elastic deformation in the axial direction based on the estimated load torque or fixed value. The stretch/contraction elastic deformation in the axial direction assumes a compensation amount related to the stretch; contraction of the ball screw. Then, the adder 308 adds the torsional elastic formation around the rotation axis and the stretch/contraction elastic deformation in the axial direction, and compensates the lost motion caused by added elastic deformation in the position command value. In this example, since the switch 303 switches to the fixed value or the load torque estimated on the input side of the ball screw length multiplying part 306, the compensation amount can keep the dependency on the length of the ball screw. At this time, the elastic deformation in the axial direction depends on the distance from the servomotor to the driven body, and this distance is estimated according to the integrated value of the movement position. When defining the estimated load torque as T and the torsion constant as a, the compensation amount related to the twist of the connecting part, which becomes the output of the torsion constant multiplying part 304, is α·T, and when defining the estimated load torque as T, length of the ball screw as d, and the shape coefficient as β, the compensation amount related to the stretch/contraction of the ball screw, which becomes the output of the shape coefficient multiplying part 305, is d·β·T. Then, the compensation amount of the total which is the output of the adder 308 becomes α·T+d·β·T.

Figure 5:
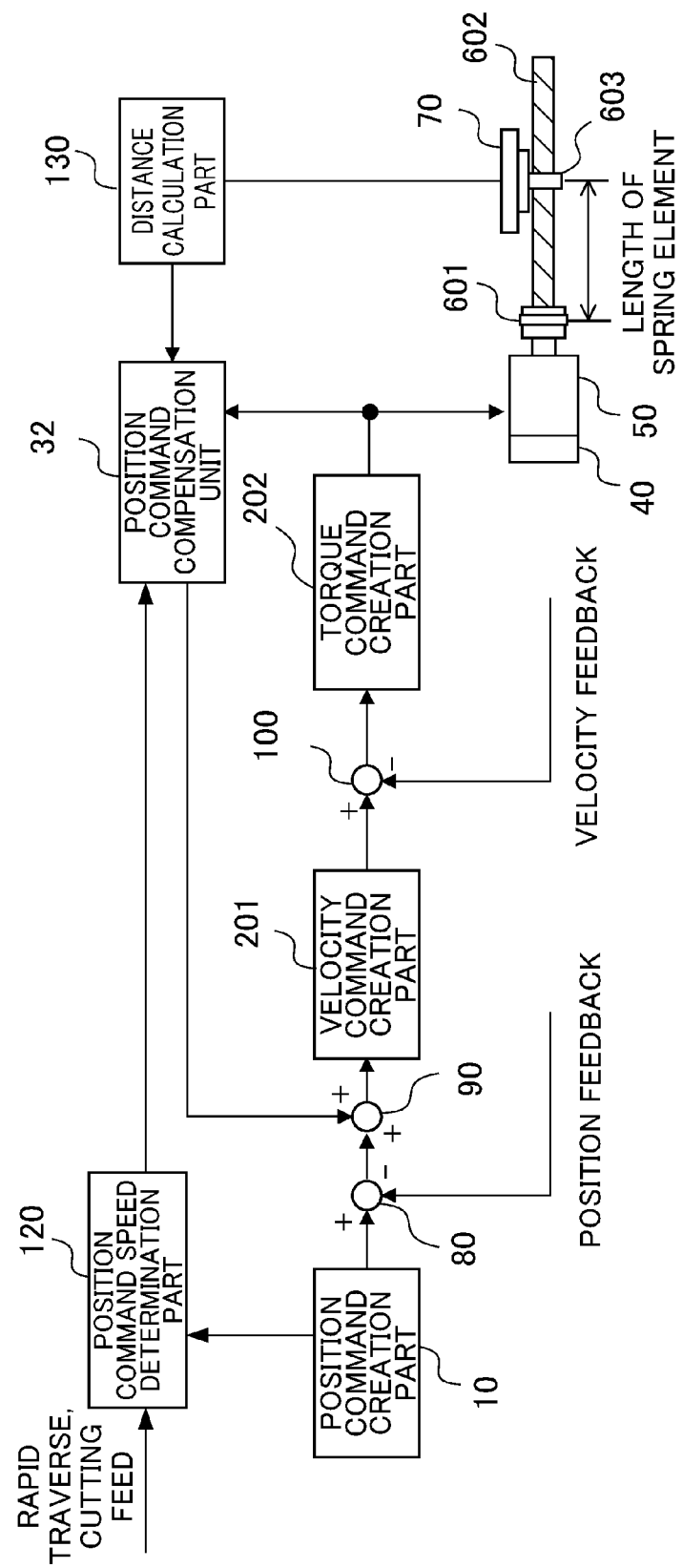
FIG. 5 is a block diagram showing one configuration example of a motor control unit and the configuration of a servomotor control device including a distance calculation unit that obtains the length of a ball screw (length of spring element)

FIG. 5 is a block diagram showing one configuration example of the motor control unit 20 and the configuration of the servomotor control device including the distance calculation part 130 which obtains the length of the ball screw (length of spring element). The length of the ball screw (length of spring element) multiplied by the ball screw length multiplier 306 in FIG. 4 is calculated by the distance calculation part 130. The motor control unit 20 in FIG. 4 has a velocity command creation part 201, subtraction part, torque command creation part 202 and subtracter 100. The predetermined fixed value is basically set by measuring the force on the axis acting on the motor during stop of the machine. This set force, in a case of there being no disturbance (external force), corresponds to the static frictional force acting on the driven body during stop of the machine, and becomes a value no more than the maximum static frictional force. According to this setting, although there is some error depending on the stop state, even if stopping estimation of the drive force and setting as the fixed value, it is possible apply compensation corresponding to the elastic deformation amount produced due to this static frictional force during stop of the machine. In addition, even during rapid traverse of the machine, the force acting on the driven body is basically a constant value of the opposite direction to the driving direction as a reaction, and estimation of the drive force is stopped also during rapid traverse of the machine, and compensation is performed according to the fixed value determined in advance corresponding to the command direction. It is possible to use the same fixed value also during low speed of the machine. Even during either of stop (or during low speed) and rapid traverse, it is possible to reflect the change in the elastic deformation of the ball screw relative to the length of the ball screw in the compensation, by way of fixing the estimated load torque, rather than the compensation amount itself. It should be noted that, the case of the ball screw being long (distance until driven body being far), the twist amount increase, and in the case of being short, decreases. Calculation of the compensation amount is (compensation amount)={(shape coefficient×ball screw length)+torsion coefficient}×(estimated load torque), and even if switching the estimated load torque to the fixed value, compensation depending on the length of the ball screw will be applied. The length d of the ball screw is the length of the ball screw from the servomotor to the connection mechanism, and changes according to the position of the table. When the command speed or command acceleration of the position command value is no more than the desired value or is rapid traverse, which is the condition for the load torque to become constant or almost constant, the load torque is set to the fixed value according to the command from the position command speed determination part 120. On the other hand, when the command speed or command acceleration of the position command value exceeds the desired value, which is the condition under which the value of the load torque is unclear and estimation is required, the load torque is estimated according to the command from the position command speed determination part 120. A situation performing compensation unrelated to operation of the servomotor is thereby avoided to the utmost, and only compensation related to lost motion due to elastic deformation is performed.

Figure 6:
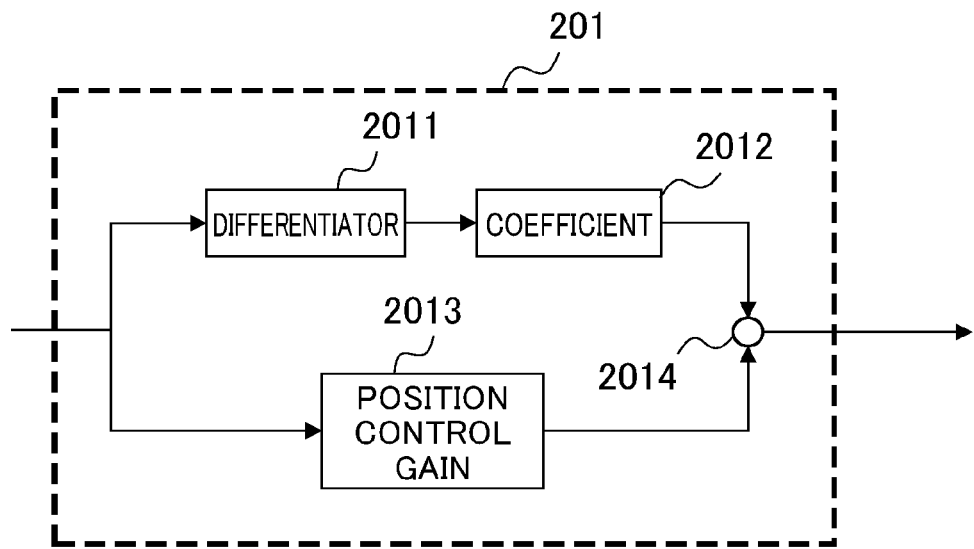
FIG. 6 is a block diagram showing one configuration example of a velocity command creation unit.
Figure 7:
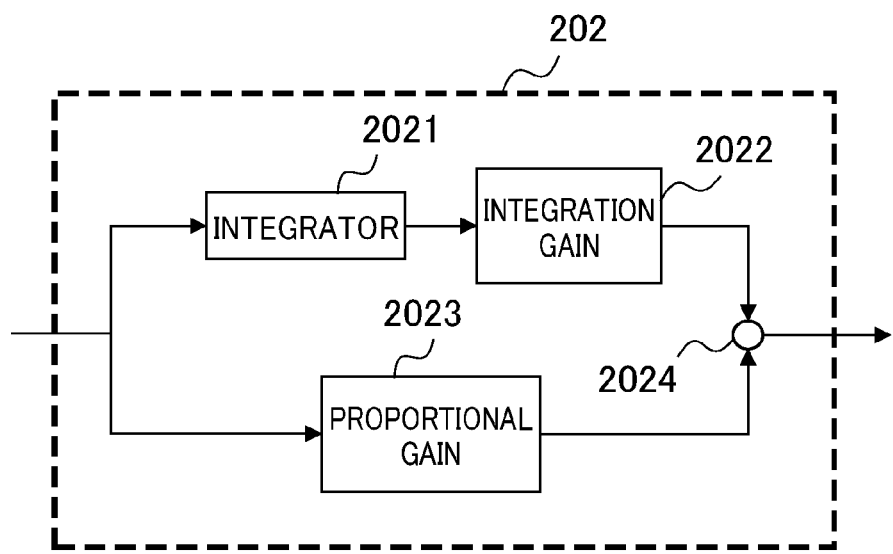
FIG. 7 is a block diagram showing one configuration example of a torque command creation unit.

FIG. 6 is a block diagram showing one configuration example of a velocity command creation part 201. As shown in FIG. 5, the position command creation unit 10 creates the position command value, the subtracter 80 obtains the difference between the position command value and the detected position of position feedback, and the adder 90 adds the compensation amount to this difference. The difference to which the compensation amount was added is inputted to a differentiator 2011 and position control gain 2013 of the velocity command creation part 201 shown in FIG. 6. The adder 2014 outputs, as a velocity command value, an addition value of the output of a coefficient part 2012 made by multiplying a coefficient by the output of the differentiator 2011, and the output of the position control gain 2013. The subtracter 100 obtains the difference between the velocity command value and the detected velocity of velocity feedback. FIG. 7 is a block diagram showing one configuration example of the torque command creation part 202. The torque command creation part 202 includes a proportional gain 2023 and integrator 2021 connected with the subtracter 100, an integration gain 2022 connected with the integrator 2021, and an adder 2024 that adds the output of the proportional gain 2023 and the output of the integration gain 2022, and outputs to the servomotor 50 as the torque command. The integrator 2021 integrates the input. The integration gain 2022 multiplies the coefficient by the output of the integrator 2021. The proportional gain 2023 multiplies the coefficient by the input. It should be noted that the integration gain 2022 and integrator 2021 may be changed in arrangement sequence.

Figure 8:
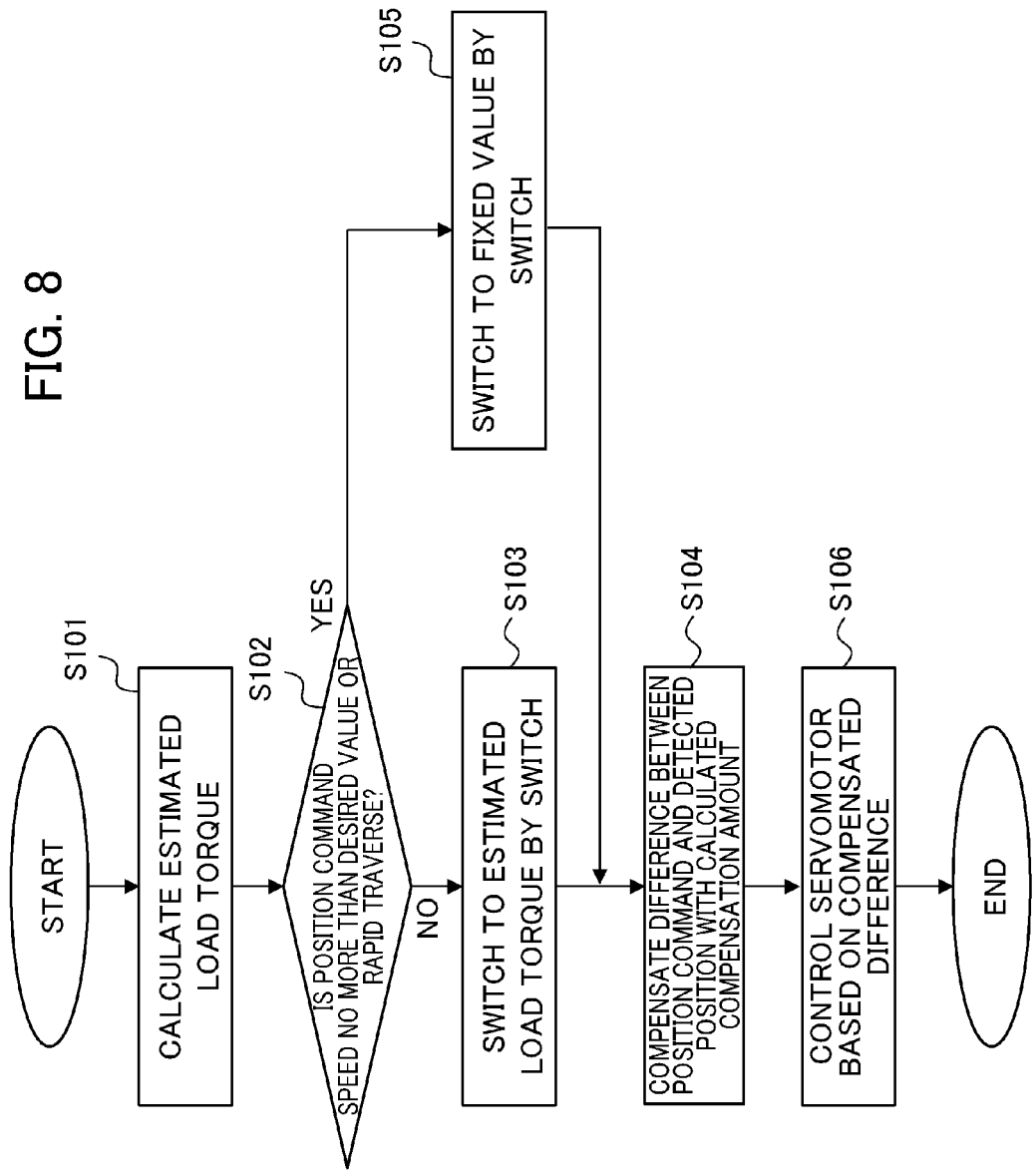
FIG. 8 is a flowchart showing operation of the servomotor control device shown in FIG. 3.

FIG. 8 is a flowchart showing the operation of the servomotor control device shown in FIG. 3. In Step S101, the force estimation part 302 calculates the estimated load torque. In Step S102, the position command speed determination part 120 determines whether the command speed of the position command value is no more than a desired value (including 0), as well as determining whether or not being rapid traverse, and the position command speed determination part 120, in the case of the command speed being no more than the desired value (including 0) or rapid traverse (case of YES in Step S102), switches to the fixed value by the switch 303 in Step S105, and then advances to Step S104.

On the other hand, in Step S102, in the case of the command speed of the position command value not being no more than the desired value, and not being rapid traverse, i.e. in the case of the command speed exceeding the desired value and being a cutting feed (case of NO in Step S102), the position command speed determination part 120 switches by the switch 303 to the estimated load torque estimated by the force estimation part 302 in Step S103, and the adder 90 compensates the difference between the position command value from the position command generation unit 10 and the detected position of the position feedback with the compensation amount calculated by the compensation amount generation part 301 in Step S104. Then, in Step S106, the motor control unit 20 controls the servomotor 50 based on the compensated difference between the position command value and the detected value. In the case of performing determination of switching of the switch 303 according to the position command acceleration, the position command speed of Step S102 is changed to the position command acceleration.

Second Embodiment

Figure 9:
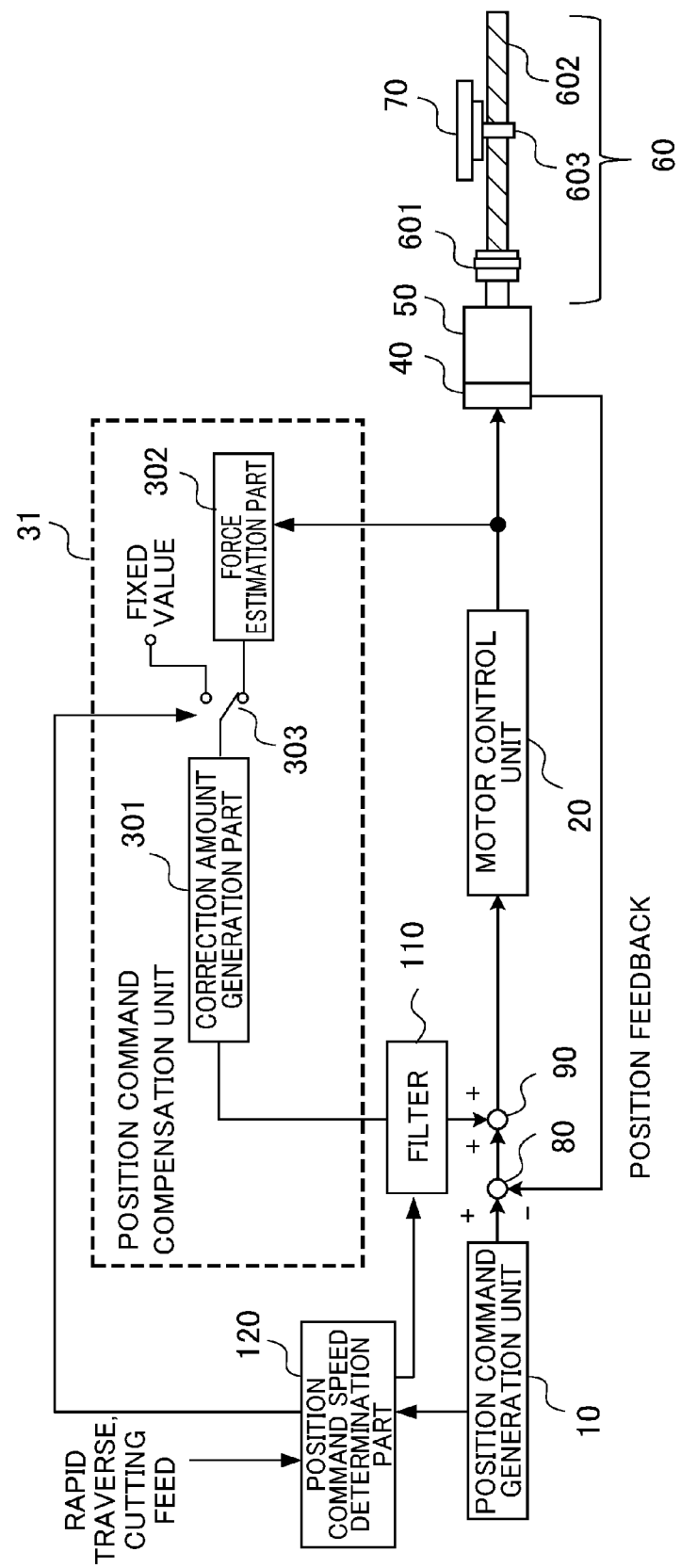
FIG. 9 is a block diagram showing the configuration of a servomotor control device serving as a second embodiment of the present invention.

With the servomotor control device of the first embodiment, when the switch 303 switches the input for the compensation amount generation unit 31 from the fixed value to the estimated load torque, the compensation amount changes discontinuously during switching. The filter 110 is provided to the output of the position command compensation unit 31 in order to prevent discontinuity of this compensation amount. FIG. 9 is a block diagram showing the configuration of a servomotor control device serving as a second embodiment of the present invention. The configuration of the servomotor control device of FIG. 9 is the same as the configuration of the servomotor control device in FIG. 3 when excluding the point of the filter 110 being provided, and the same constitutional members are assigned the same reference symbols, and explanations thereof will be omitted. The filter 110 can employ a low-pass filter.

Figure 10:
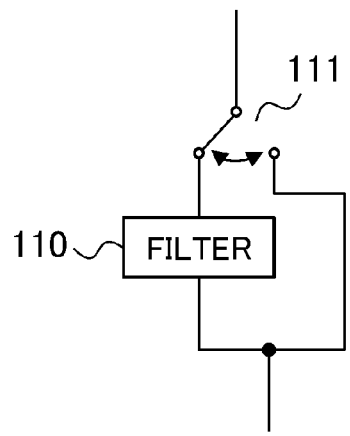
FIG. 10 is a drawing showing filters and a switch for switching filters.
Figure 11:
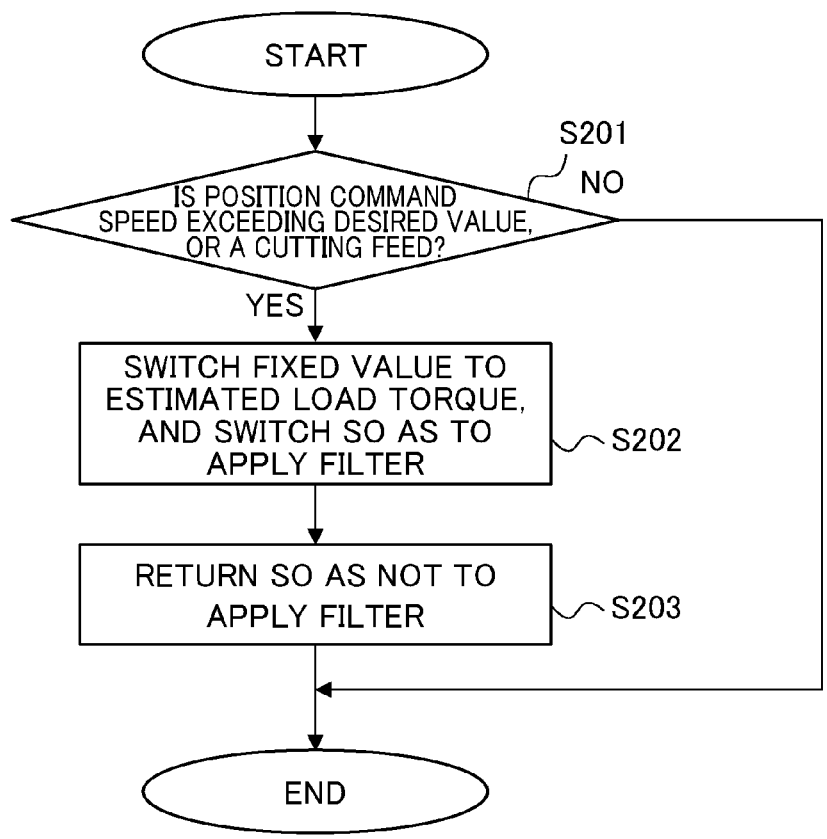
FIG. 11 is a flowchart showing a switching operation of filters.

It may be configured so that the filter 110 is connected between the compensation amount generation part 301 and adder 90 only during switching from the fixed value to the estimated load torque by the switch 303 serving as a switching part, by way of the selector switch 111 shown in FIG. 10, and after switching by way of the switch 303, between the compensation amount generation part 301 and adder 90 is connected by the selector switch 111 without going through the filter 110. The switching of the selector switch 111 is performed based on the command signal by the position command speed determination part 120 shown in FIG. 3, etc., and switching of the selector switch 111 is performed when the switch 303 switches from the fixed value to the estimated load torque. FIG. 11 is a flowchart showing the switching operation of the filter 110. In Step S201, in the case of the command speed of the position command value exceeding a desired value and the position command speed determination part 120 determining as a cutting feed (YES in Step S201), the position command speed determination part 120 switches from the fixed value to the estimated load torque by the switch 303, and switches the selector switch 111 so as to apply the filter at this time in Step S202. Subsequently, the position command speed determination part 120, when discontinuity of the compensation amount is eliminated, switches the selector switch 111 so as not to apply the filter in Step S203. In the case of performing determination of switching of the switch 303 according to the position command acceleration, the position command speed in Step S201 is changed to the position command acceleration.

Third Embodiment

Figure 12:
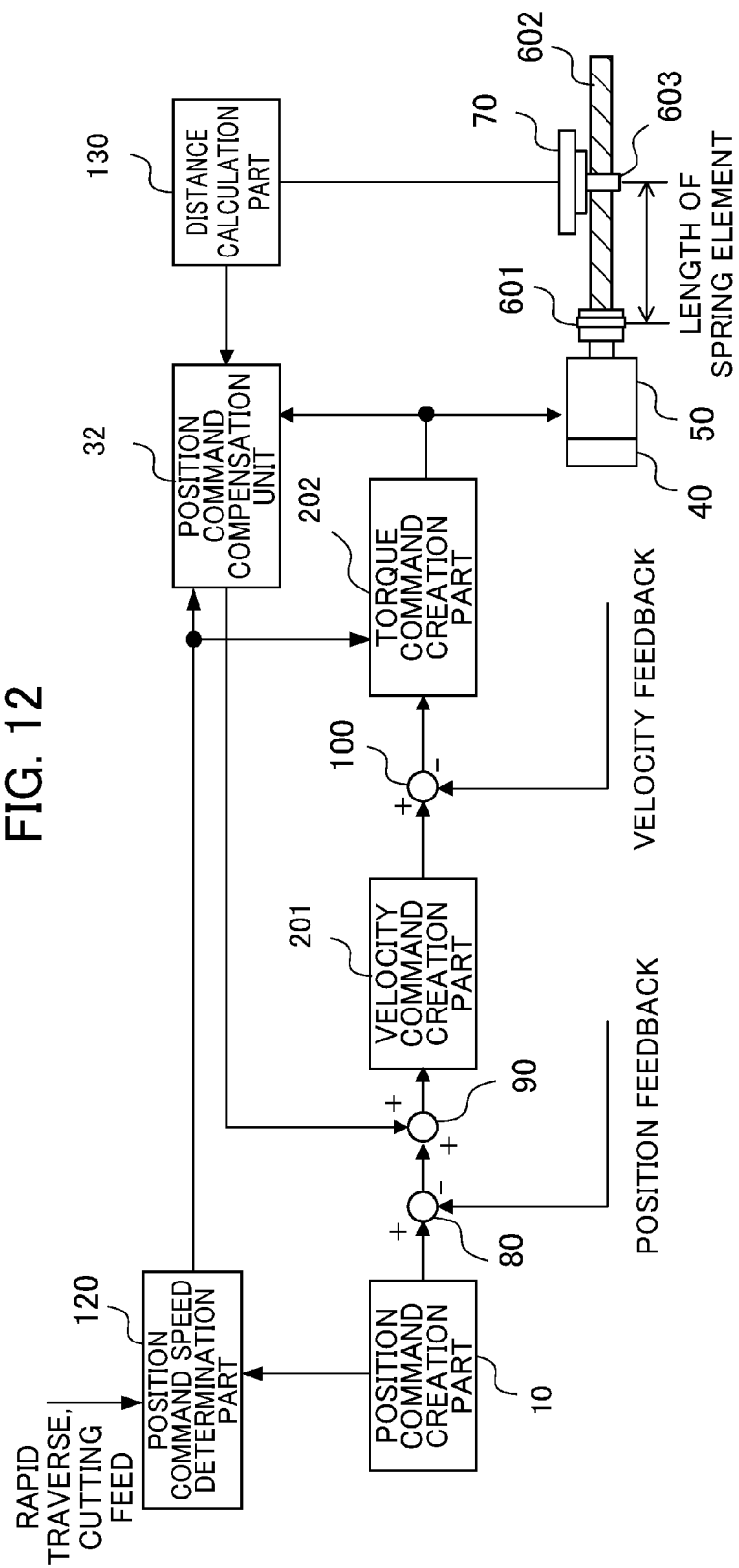
FIG. 12 is a block diagram showing the configuration of a servomotor control device serving as a third embodiment of the present invention.
Figure 13:
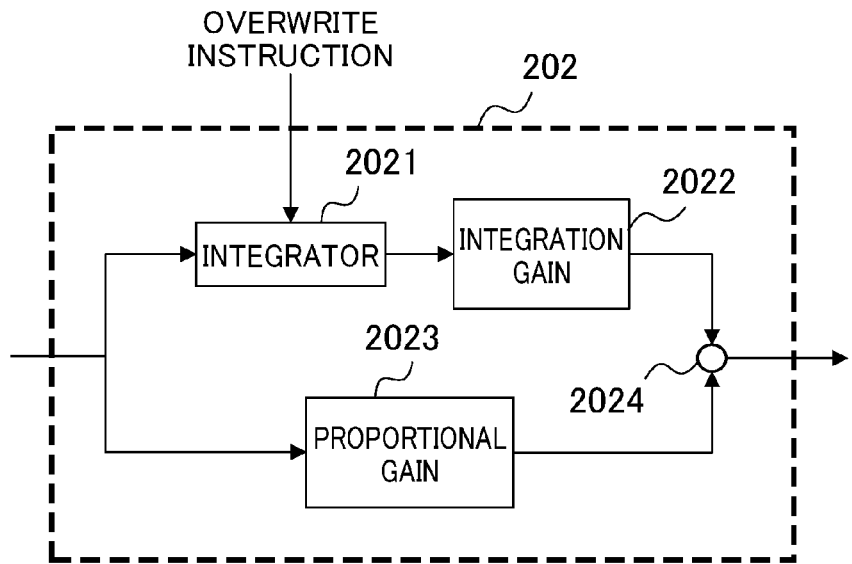
FIG. 13 is a block diagram showing the configuration of torque command creation part.

The servomotor control device of the second embodiment provides the filter 110 to the output of the position command compensation unit 31 for preventing discontinuity in the compensation amount; however, it may be configured so that overwriting of the integrator 2011 of the torque command creation part 202 is performed to not produce discontinuity in the torque command value, in place of providing the filter. When the compensation amount compensating the position command value is entered during restart, a change in the velocity command value occurs. It is configured so that overwriting of the integrator is performed so that the torque command value does not change due to the change in this velocity command value, and the torque command value is no longer discontinuous. FIG. 12 is a block diagram showing the configuration of a servomotor control device serving as a third embodiment of the present invention. The configuration of the servomotor control device of FIG. 12 is the same as the configuration of the servomotor control device in FIG. 5 when excluding the point of the position command speed determination part 120 sending an overwrite instruction for the integrator to the torque command creation part 202, and the same reference symbols are assigned for identical constitutional members, and explanations thereof will be omitted. FIG. 12 is a block diagram showing the configuration of the torque command creation part 202. As shown in FIG. 13, the overwrite instruction is sent to the integrator 2021.

The overwrite instruction is sent during switching from the fixed value to the estimated load torque by the switch 303, based on the instruction signal from the position command speed determination part 120 shown in FIG. 3, etc. The overwrite instruction may be the same signal as the switching signal sent to the switch 303; however, it may be separately generated from the switching signal. Overwriting of the integrator 2021 is performed as follows based on the overwrite instruction. The torque command value TCMD is expressed by Formula 1, when defining Vcmd as the velocity command value, Vfb as the detected velocity, kp as the proportional gain, and ki and the integration gain.

TCMD=Σ(Vcmd−Vfb)×ki+(Vcmd−Vfb)×kp     [Formula 1]

When restarting the updating of the compensation amount from updating interrupt of the compensation amount, the torque command value TCMD becomes TCMD (2) from TCMD (1).

$$TCMD(1) = \qquad \text{[Formula 2]}$$
$$\Sigma(Vcmd(1) - Vfb(1)) \times ki + (Vcmd(1) - Vfb(1)) \times kp$$
$$TCMD(2) = \Sigma(Vcmd(2) - Vfb(2)) \times ki +$$
$$(Vcmd(2) - Vfb(2)) \times kp$$
$$= (TCMD(1) + Vcmd(2) - Vfb(2))) \times ki +$$
$$(Vcmd(2) - Vfb(2)) \times kp$$

In the present embodiment, TCMD(1) (Vcmd(2) Vfb(2)) of the torque command value TCMD(2) is overwritten by the following Formula 3.

(TCMD(1)−(Vcmd(2)−Vfb(2))×kp)/ki     [Formula 3]

When this is done, the overwritten torque command value TCMD' (2) is the same as TCMD(1), and discontinuity of the torque command does not arise.

Figure 14:
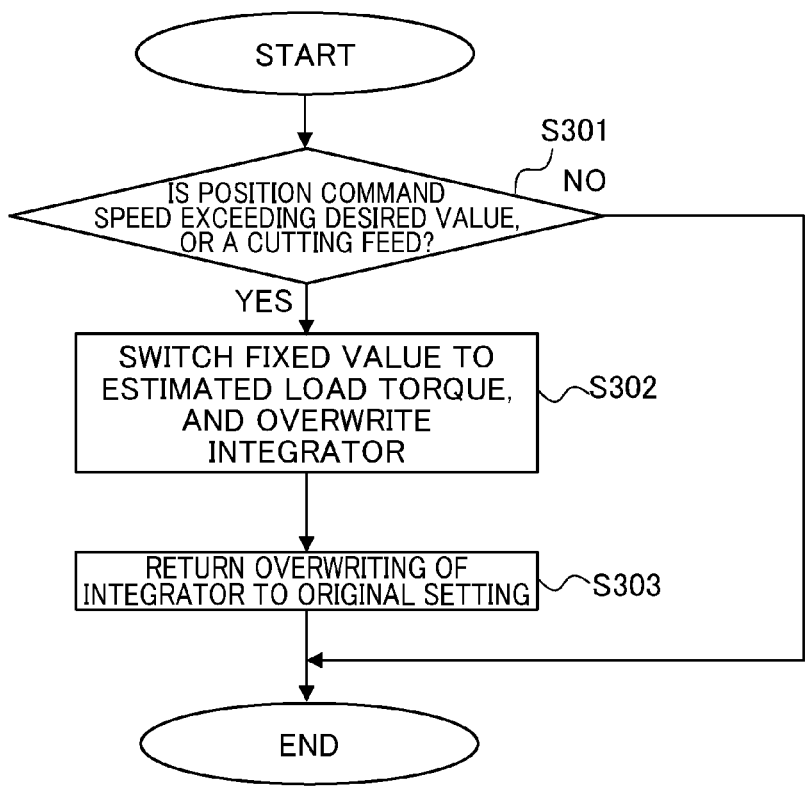
FIG. 14 is a flowchart showing a switching operation of integrators.

FIG. 14 is a flowchart showing the switching operation of the integrator 2021. In a case of the command speed of the position command value exceeding the desired value and the position command speed determination part 120 determining as a cutting feed in Step S301 (YES in Step S301), the position command speed determination part 120 switches from the fixed value to the estimated load torque by way of the switch 303, and performs overwriting of the integrator at this time, in Step S302. Subsequently, when discontinuity of the compensation amount is eliminated, overwriting of the integrator is returned to original setting in Step S303. In the case of performing determination of switching of the switch 303 according to the position command acceleration, the position command speed in Step S302 is changed to the position command acceleration. In the respective embodiments explained above, the position command speed determination part 120 receives the position command value created by the position command creation unit 10 and generates the command speed of the position command value (position command speed), as well as receiving a signal indicating rapid traverse or a cutting feed. Then, the position command speed determination part 120, when the command speed (absolute value) is no more than the desired value (including 0), or when rapid traverse, sends a switching signal to the switch 303 serving as a switching part, so as to switch the drive force (drive torque) acting on the drive body at the connecting part from the drive force estimated by the force estimation part 302 to the fixed value. On the other hand, the position command speed determination part 120, when the command speed (absolute value) exceeds the desired value, and is a cutting feed, sends a switching signal to the switch 303, so as to switch the drive force (drive torque) acting on the drive body at the connecting part to the drive force estimated by the force estimated part 302. However, in each of the embodiments, the position command speed determination part 120 may be configured so as to receive the position command value created by the position command creation unit 10 without receiving a signal instructing rapid traverse or a cutting feed, and generate the command speed of the position command value (position command speed), and when the command speed (absolute value) is no more than the desired value (including 0), switch the drive force (drive torque) acting on the drive body at the connecting part from the drive force estimated by the force estimation part 302 to the fixed value, and when the command speed (absolute value) exceeds the desired value, switch the drive force (drive torque) acting on the drive body at the connecting part to the drive force estimated by the force estimation part 302.

As explained above, in each of the embodiments, when the position command speed or position command acceleration is no more than the desired value or is rapid traverse, the estimated load torque is set to the fixed value determined in advance. During rapid traverse operation, basically, the load torque is constant, and based on this, during rapid traverse is also compensated by setting the load torque to a fixed value. Due to setting the estimated load torque to the fixed value, it is possible to perform compensation dependent on the length of the ball screw. Although updating of the load torque is no longer performed, the influence of the length of the ball screw for elastic deformation relative to load torque can be reflected. On the other hand, when the position command speed exceeds the desired value and during a cutting feed, it is compensated using the load torque estimated by the torque command during operation. In this way, with each embodiment, it is possible to compensate only the lost motion of the machine, without performing compensation unrelated to operation of the servomotor.

Although embodiments of the present invention have been explained above, the servomotor control device can realize the entirety or part of the functions thereof by hardware, software, or combinations thereof. Herein, realizing by way of software indicates the matter of being realized by a computer reading and executing programs. In the case of constituting by hardware, a part or the entirety of the compensation amount generation part 301, force estimation part 302, position command generation unit 10 and motor control unit 20 of the servomotor control device can be configured by circuits for which integrated circuits (IC) such as LSI (large Scale Integrated Circuit), ASIC (Application Specific Integrated Circuit), gate array, and FPGA (Field Programmable Gate Array) are representative, for example. In the case of realizing by software, it is possible to configure a part or the entirety of the servomotor control device by a computer including a CPU and a storage unit such as a hard disk and ROM storing programs, and then execute operations of a part or the entirety of the servomotor control device by storing the information required in computation in a second storage unit such as RAM, and executing processing in accordance with the block diagrams of FIGS. 3 to 7 and program following the flowchart of FIG. 8, the block diagrams of FIGS. 9 and 10 and a program following the flowchart of FIG. 11, and the block diagram of FIGS. 12 and 13 and a program following the flowchart of FIG. 14. The program can be read from an external storage medium such as CD-ROM, DVD or flash memory on which the program is recorded, into a storage unit such as a disk drive.

The programs can be stored using various types of computer readable storage media, and provided to the computer. The computer readable recording medium includes tangible storage media. The compute readable recording medium includes non-transitory computer readable storage media. Examples of computer-readable recording media include magnetic media (for example, flexible disk, magnetic tape hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although the respective embodiments and examples of the present invention have been explained above, the present invention is not to be limited to the aforementioned respective embodiments and examples, and for one skilled in the art, it is possible to modify or change into various forms within a scope not departing from the gist of the present invention, based on the disclosure in the claims, and these modified examples or changed examples also fall under the scope of rights of the present invention.

EXPLANATION OF REFERENCE NUMERALS 10 position command generation unit
20 motor control unit
30, 31 position command compensation unit
40 encoder
50 servomotor
60 connection mechanism
70 table
301 compensation amount generation part
302 force estimation part
303 switch

What is claimed is:

1. A servomotor control device, comprising:
a servomotor;
a driven body adapted to be driven by the servomotor;
a connection mechanism for connecting the servomotor and the driven body, and transmitting power of the servomotor to the driven body;
a position command generation unit for generating a position command value for the driven body;
a motor control unit for controlling the servomotor using the position command value;
a force estimation part for estimating a drive force acting on the driven body at a connecting part with the connection mechanism;
a switching part for switching between a first force estimated value estimated by the force estimation part, and a second force estimated value of a fixed value; and
a compensation amount generation part for generating a compensation amount for compensating the position command value generated by the position command generation part, based on the first force estimated value or the second force estimated value which was switched by the switching part.

2. The servomotor control device according to claim 1, wherein the compensation amount generation part sets, as the compensation amount, a sum of: a product of the first or second force estimated value that was switched to by the switching part and a first coefficient; and a product of the first or second force estimated value that was switched to by the switching part, a distance from the servomotor to the connecting part, and a second coefficient.

3. The servomotor control device according to claim 1, wherein the second force estimated value is a constant value determined in advance, the constant value having a sign corresponding to a direction of a position command created by the position command generation part.

4. The servomotor control device according to claim 1, wherein the switching part selects the second force estimated value when a command speed or a command acceleration for the position command value created by the position command generation part is no more than a desired value.

5. The servomotor control device according to claim 1, wherein the switching part selects the second force estimated value during rapid traverse operation.

6. The servomotor control device according to claim 1, wherein a filter is applied to the compensation amount generated by the compensation amount generation part, when switching from the second force estimated value to the first force estimated value by way of the switching part.

7. The servomotor control device according to claim 1, wherein the motor control unit has a velocity command creation part and a torque command creation part,
wherein the torque command creation part has at least an integrator for integrating a speed deviation, and
wherein overwriting of the integrator is performed when switching from the second force estimated value to the first force estimated value by way of the switching part.

8. A servomotor control method for controlling a servomotor in a servomotor control device including the servomotor;

a driven body adapted to be driven by the servomotor; and
a connection mechanism for connecting the servomotor and the driven body, and transmitting power of the servomotor to the driven body, the method comprising the steps of:
generating a position command value for the driven body;
estimating drive force acting on the driven body at a connecting part with the connection mechanism;
switching from an estimated first force estimated value to a second force estimated value which is a fixed value, in a case of a command speed or command acceleration of the position command value being no more than a predetermined value or being rapid traverse;
compensating the position command value thus generated, based on the second force estimated value that was switched to; and
controlling the servomotor using the position command value thus compensated.

9. The servomotor control method according to claim 8, wherein the position command compensation value for compensating the position command value is a sum of: a product of the second force estimated value and a first coefficient; and the second force estimated value, a distance from the servomotor to the connecting part, and a second coefficient.

10. The servomotor control method according to claim 8, wherein the second force estimated value is a constant value determined in advance, the constant value having a sign corresponding to a direction of a position command.

11. The servomotor control method according to claim 8, further comprising applying a filter to the compensation value for the position command value, when switching from the second force estimated value to the first force estimated value.

12. The servomotor control method according to claim 8, wherein the servomotor is controlled by creating a velocity command using the position command value that was compensated, creating a torque command using a velocity command that was created, and then using the torque command,
wherein creating of the torque command is performed using an integrator that integrates at least speed deviation, and
wherein overwriting of the integrator is performed when switching from the second force estimated value to the first force estimated value.

13. A non-transitory computer-readable recording medium encoded with a program for controlling a servomotor which causes a computer to execute servomotor control in a servomotor control device including the servomotor;
a driven body adapted to be driven by the servomotor; and
a connection mechanism for connecting the servomotor and the driven body, and transmitting power of the servomotor to the driven body,
the program causing the computer to execute processing of:
generating a position command value for the driven body;
estimating drive force acting on the driven body at a connecting part with the connection mechanism;
switching from an estimated first force estimated value to a second force estimated value which is a fixed value, in a case of a command speed or command acceleration of the position command value being no more than a predetermined value or being rapid traverse;
compensating the position command value thus generated, based on the second force estimated value that was switched to; and
controlling the servomotor using the position command value thus compensated.

* * * * *